Jan. 9, 1968    P. C. BERTELSON ET AL    3,362,194
FRICTION CLUTCH WITH VIBRATION DAMPER
Filed Nov. 23, 1965
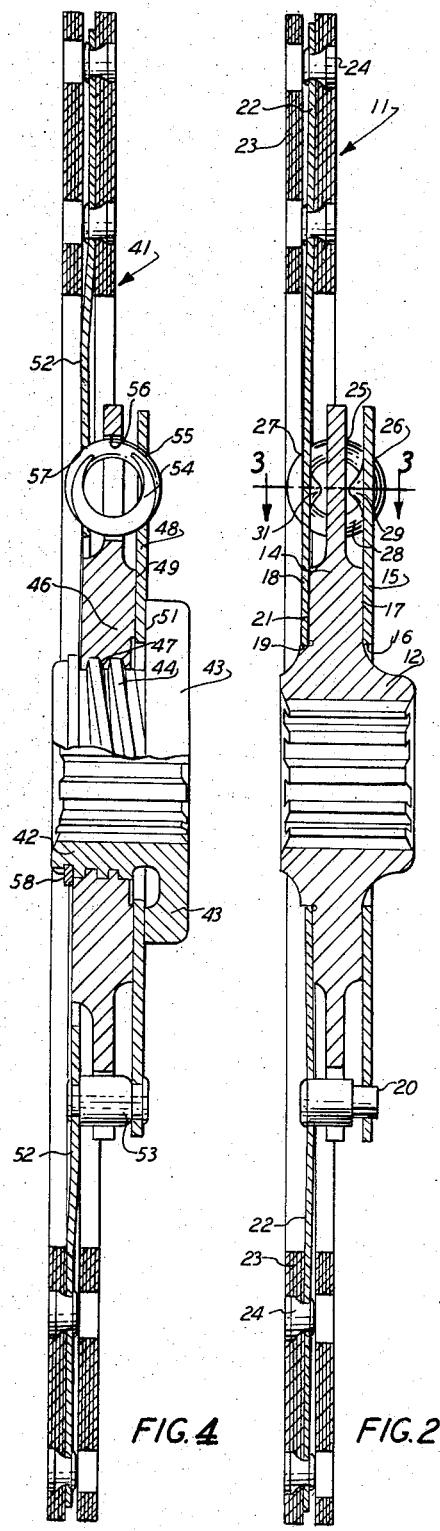
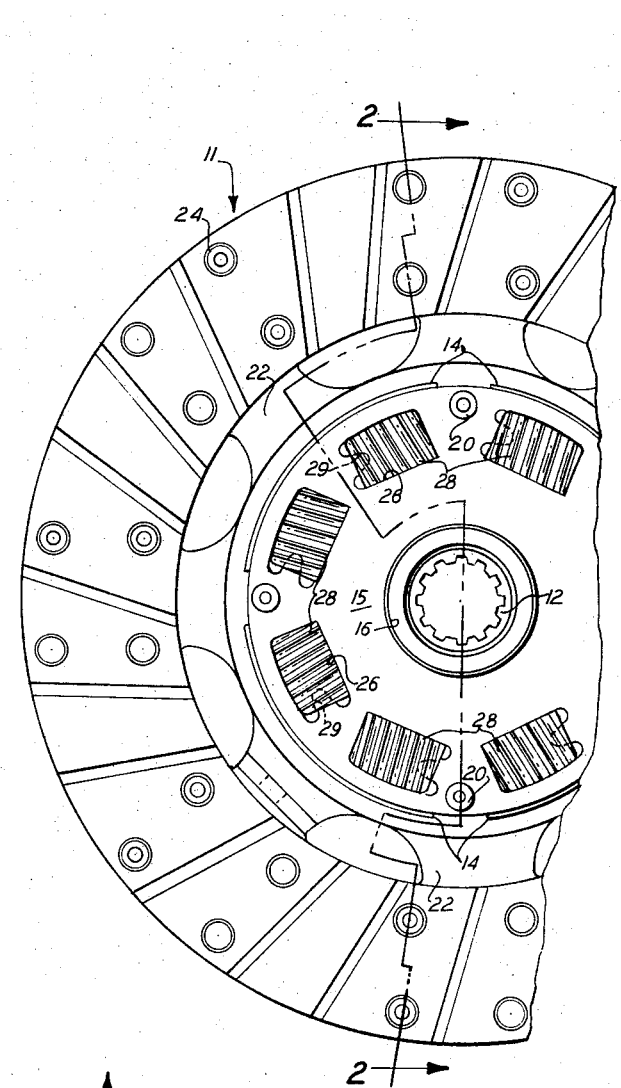
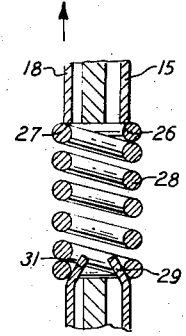
FIG. 1
FIG. 2
FIG. 3
FIG. 4
PETER C. BERTELSON
CHARLES C. BOOKOUT
INVENTORS
BY John R. Faulkner
Robert E. McCallum
ATTORNEYS

United States Patent Office 3,362,194
Patented Jan. 9, 1968

3,362,194
FRICTION CLUTCH WITH VIBRATION DAMPER
Peter C. Bertelson, Franklin, and Charles C. Bookout, Livonia, Mich., assignors to Ford Motor Company, Dearborn, Mich., a corporation of Delaware
Filed Nov. 23, 1965, Ser. No. 509,365
12 Claims. (Cl. 64—27)

ABSTRACT OF THE DISCLOSURE

A friction clutch constructed such that frictional forces directly proportional to the input torque applied to the clutch act to damp clutch vibrations. The clutch includes a driving clutch plate to which torque is applied, a driven member and springs operatively coupling the plate and the member for limited relative rotation. Cooperating means integral with the clutch plate and the driven member retard relative rotation therebetween with a frictional force directly proportional to the torque applied to the clutch plate.

---

This invention relates to a power transmitting device and more particularly to a clutch for the power train of a motor vehicle.

The use of clutches in motor vehicle power trains has been plagued historically with the problem of torsional vibration of the connected elements of the power train, especially at the time of clutch engagement. Such vibrations are known in the art as "chatter." This problem has been attributed to a variety of causes including axial misalignment of power train elements, engine vibration on resilient engine mounts and the frictional characteristics of the clutch disc facing.

It has been common to employ in the design of vehicular clutches a plurality of torsional springs connected in parallel with a dry-friction or coulomb damping arrangement. When properly tuned, a clutch of such design dissipates a portion of the energy (cyclic torque) tending to cause chatter. However, due to the fact that the propensity for chatter increases with the amount of torque applied to the clutch, such designs, which provided for a constant rate of energy dissipation, were found to be less than wholly satisfactory.

Analysis of clutch dynamics indicates that optimum dissipation is attained when the energy dissipation or damping rate is varied and made proportional to the torque applied to the clutch.

It is, therefore, the principal object of the invention to provide a power transmitting device that will be free of "chatter."

A further object of the invention is to provide a motor vehicle clutch wherein the vibration damping rate is proportional to the power input to the clutch.

A power transmitting device incorporating the invention and accomplishing the above objectives includes an annular driven hub having a disc-like radial projection. The hub is positioned in the central apertures of a rotatable retaining plate and a rotatable driving plate or clutch disc. One helical compression spring is mounted in each of a plurality of aligned apertures in the two plates to couple the plates for a limited, substantially unitary rotation relative to the projection. Further means are provided for urging various elements of the device into a frictional engagement with a force which varies with the torque applied to the driving plate.

Further objects and advantages of this invention will become more apparent when considered in conjunction with the accompanying drawing wherein:

FIGURE 1 is a front view of a portion of a clutch assembly constructed in accordance with this invention;

FIGURE 2 is an enlarged sectional view of the clutch portion of FIGURE 1 taken along the line 2—2 of FIGURE 1;

FIGURE 3 is a sectional view of a detail taken along the line 3—3 of FIGURE 2; and FIGURE 4 is a view similar to that of FIGURE 2 illustrating an alternate embodiment of the invention.

Referring now in detail to the drawing, FIGURE 1 shows a friction disc assembly 11 suitable for use in a dry friction disc type clutch. Assembly 11 includes a sleeve-like output hub 12 that is internally splined for connection with a shaft (not shown) to be driven. A projection 14 extends radially from the central portion of hub 12.

A disc shaped spring retaining plate 15, having a central aperture 16, surrounds the central portion of hub 12 and abuts against contact surface 17 formed on one side of projection 14. A driving clutch disc or plate 18, having a central aperture 19, surrounds hub 12 and abuts contact surface 21 formed on projection 14. Clutch plate 18 is formed with conventional circumferentially spaced paddles 22 to which friction facing material 23 is attached by means of rivets 24. Pilot pins 20 lock plates 15 and 18 for rotation and facilitate the assembly of the device.

Projection 14 and plates 15 and 18 are formed with apertures 25, 26 and 27, respectively. The hub 12 and plates 15 and 18 are assembled so that the apertures 25, 26 and 27 are axially aligned. A clutch spring 28 is located in each of the sets of apertures 25, 26 and 27. While a plurality of springs 28 are shown, it readily can be appreciated that the device will function with but a single spring located in a single set of apertures.

Preferably, springs 28 have a spring constant such that they cannot be completely compressed by the power available from the vehicle powerplant. It can thus be seen that upon the application of torque to plate 18, springs 28 will force rotation of projection 14 while permitting a limited rotation of plates 15 and 18, which rotate together due to pilot pins 20, relative to projection 14 of hub 12 which is bearing a load.

As can best be seen by reference to FIGURE 3 plates 15 and 18 have converging extensions 29 and 31, respectively, extending into apertures 26 and 27 and bearing against springs 28.

In operation, upon the application of torque to clutch plate 18, this plate rotates causing a simultaneous rotation of plate 15 due to their connection by pins 20. Since plates 15 and projection 14 bear against the ends of springs 28, these springs attempt to rotate the projection 14 and hub 12. Assuming a load on hub 12, its resistance to movement causes a compression of springs 28 and allows a sliding of connected plates 14 and 18 relative to projection 14 of hub 12 along surfaces 17 and 21 of projection 14. The relative rotation causes spring 28 to press against inclined extensions 29 and 31 forcing the extensions inwardly and causing a variable friction clamping engagement of plates 15 and 18 with projection 14 which varies with the torque applied to plate 18. Energy damping frictional forces thus arise at surfaces 17 and 21. This action continues until the combination of the increasing compressive force of springs 28 and the frictional forces are sufficient to overcome the load on hub 12. At this time, projection 14 of hub 12 and plates 15 and 18 will rotate as a unit to drive hub 12 at the speed of plate 18. The springs 28 will return to their original extended position as the torque differential between plate 18 and hub 12 diminishes. The variable clamping action, however, will continue as long as there exists a torque differential between the drive (plate 18) and driven member (hub 12).

A second embodiment of friction disc assembly constructed in accordance with the invention is illustrated in FIGURE 4 and designated by the numeral 41. This device includes output hub 42 having projection 43 extending radially therefrom. Hub 42 has an external helical thread 44 that mates with a thread 47 formed internally on a web or spider member 46.

A plate 48 is located between spider 46 and projection 43 and abuts the former at 49 and the latter at 51. A driving clutch disc or plate 52 is joined to plate 48 by rivets 53 (only one shown).

Clutch springs 54 (only one shown) are mounted in axially aligned apertures 55, 56 and 57 formed in plate 48, spider 46 and clutch plate 52, respectively. Snap ring 58 holds the clutch assembly together.

Clutch 41 operates in the following manner. The application of input torque to plate 52, rotates this plate in unison with plate 48 due to rivets 53. The load on hub 42 causes a rotation of plates 48 and 52 relative to projection 43. Friction between threads 44 and 47 transmits a portion of the load on hub 42 to spider 46 causing the two plates 48 and 52 to rotate relative to the spider and compress springs 54. This relative rotation causes energy damping frictional forces to arise at 49 and 51. When the compressive force springs 54 overcomes the friction between threads 44 and 47, the spider 46 then begins to rotate with the two plates 48 and 52 and relative to hub 42. Due to threads 44 and 47, as spider 46 rotates it moves along the axis of hub 42 clamping plate 51 into tighter engagement between spider 46 and projection 43. This clamping action increases the energy damping frictional forces at 49 and 51 proportionally to the torque applied to clutch plate 52. This action continues until the clamping action of spider 46 is sufficient to overcome the load on hub 42 and the clutch assembly rotates as a unit. The springs 54 will return to their original extended position as the torque differential between plate 52 and hub 42 diminishes. The variable clamping action, however, will continue as long as there exists an input torque.

It is to be understood that the invention is not limited to the exact construction shown and described, but that various changes and modifications may be made without departing from the spirit and scope of the invention as defined by the appended claims.

We claim:

1. A power transmitting device comprising an annular driven hub having a radial projection extending therefrom; a rotatable, annular spring retaining plate surrounding said hub, said plate having an aperture spaced radially from the centrl axis thereof; a rotatable, annular driving plate to which torque is applied, said driving plate surrounding said hub and having an aperture aligned with the spring retaining plate aperture; means including a spring removably mounted in said apertures and coupling said plates for limited substantially unitary rotation relative to said hub; and further means urging said retaining plate and said projection into contact with a force directly proportional to the torque applied to said driving plate.

2. A power transmitting device comprising a generally annular output hub having a radial projection, said projection having a contact surface thereon, a rotatable disc surrounding said hub and frictionally engaging said contact surface, a rotatable plate to which torque is applied surrounding said hub, means including a spring operatively connecting said disc and said plate for limited substantially unitary rotation relative to said hub, and further means operatively connected to said disc and plate forcing said disc and plate towards one another with a force directly proportional to the torque applied to said plate.

3. A power transmitting device comprising a generally annular output hub having a radial projection, said projection having a contact surface thereon, a rotatable disc surrounding said hub and frictionally abutting said contact surface, a rotatable plate to which torque is applied surrounding said hub, means including a spring operatively connecting said disc and said plate for limited substantially unitary rotation relative to said hub, and further means operatively connected to said disc and plate and forcing said disc into frictional engagement with said contact surface with a force directly proportional to the torque applied to said plate.

4. A power transmitting device comprising an output hub, a pair of axially aligned rotatable discs surrounding said hub, one of said discs having a surface to which torque is applied, means including a spring operatively connecting said discs for limited substantially unitary rotation of said discs relative to said hub, and further means operatively connecting said discs and hub and urging said discs towards one another with a force directly proportional to the torque applied to said one disc.

5. A power transmitting device comprising: an annular output hub having a radial projection extending therefrom; a rotatable disc surrounding said hub and contacting one side of said projection; a rotatable driving disc to which torque is applied surrounding said hub and contacting the other side of said projection; a plurality of springs removably mounted in circumferentially spaced, substantially aligned apertures formed in said discs and said projection; each of said discs having angled extentions protruding therefrom adjacent the corresponding side of apertures, said extensions converging toward each other and abutting against said springs; whereby the application of torque to said driving disc and springs urges said discs into contact with said projection with a force proportional to the torque applied to the driving disc while the discs move in limited unitary rotation relative to said projection.

6. A power transmitting device comprising an annular driven hub having a radial projection extending therefrom; a rotatable disc surrounding said hub and contacting one side of said projection; a rotatable driving plate to which torque is applied, said plate surrounding said hub and contacting the other side of said projection; a spring operatively connecting said plate, projection and disc for rotation; and means on said plate and disc engaged by said spring for forcing said plate and disc into contact with said projection with a force directly proportional to the torque applied to said plate.

7. A power transmitting device comprising an annular output hub having a radial projection, a pair of axially aligned discs surrounding said hub, said discs contacting said projection on obverse sides of said projection, spring means coupling said discs and said hub for limited relative rotation between said discs and said hub, and means integral with said discs and clamping said discs into contact with said projection with a force directly proportional to torque applied to one of said discs.

8. A power transmitting device comprising an output member, a pair of rotatable discs surrounding said member, spring means operatively connecting said discs and member for limited substantially unitary rotation of said discs relative to said member, and means on said discs forcing said discs into contact with said member with a force directly proportional to torque applied to one disc.

9. A power transmitting device comprising an annular output hub having a radial projection extending therefrom, a disc member surrounding said hub and contacting said projection, a web member surrounding said hub and contacting said disc, a driving member to which torque is applied surrounding said hub and clamped for rotation with said disc member, spring means operatively connecting said members and permitting limited rotation of said disc member and said driving member relative to said web member, and cooperating means integral with said web and said hub and forcing said hub and web and disc members into contact with a force proportional to the torque applied to said driving member.

10. A device according to claim 9 wherein said last mentioned means comprise mating helical threads formed on said web member and said hub.

11. A power transmitting device comprising a driven output member, a driving member to which torque is applied, first means interconnecting said members for axial relative movement therebetween upon the application of torque to one of said members, said means comprising a helical thread connection, and said second means positioned in frictional contact with said members and limiting the relative rotation with a force proportional to the torque applied to said driving member.

12. A power transmitting device comprising an annular output hub having a radial projection extending therefrom, three rotatable discs surrounding said hub, means including a spring operatively connecting said discs for substantially unitary limited rotation relative to said hub, and means integral with said hub and one of said discs and urging said discs toward said projection with a force proportional to torque applied to one of said discs.

References Cited

UNITED STATES PATENTS

| 1,460,131 | 6/1923 | Holy | 64—27 X |
| 1,749,554 | 3/1930 | Wichert | 64—27 |
| 1,861,251 | 5/1932 | Wemp | 192—68 |
| 2,146,153 | 2/1939 | Mathewson | 64—27 |
| 2,745,268 | 5/1956 | Reed | 64—27 |
| 3,117,432 | 1/1964 | Schleicher | 64—27 |

HALL C. COE, *Primary Examiner.*